No. 690,109. Patented Dec. 31, 1901.
E. N. HUBBARD.
FISH HOOK.
(Application filed Aug. 14, 1901.)
(No Model.)
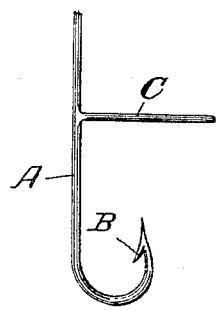

UNITED STATES PATENT OFFICE.

EDWIN N. HUBBARD, OF MIDDLETOWN, CONNECTICUT.

FISH-HOOK.

SPECIFICATION forming part of Letters Patent No. 690,109, dated December 31, 1901.

Application filed August 14, 1901. Serial No. 72,029. (No model.)

*To all whom it may concern:*

Be it known that I, EDWIN N. HUBBARD, a citizen of the United States, and a resident of Middletown, county of Middlesex, State of Connecticut, have invented certain new and useful Improvements in Fish-Hooks, of which the following is a specification.

The object of my invention is to provide a fish-hook having features of novelty and advantage.

Referring to the drawing, the figure represents a fish-hook embodying my invention.

A denotes the shaft of an ordinary fish-hook, with the usual barbed point B. Secured to the shaft and extending from it at an angle thereto is the rigid arm C, which projects over the barbed point of the hook, but at a considerable distance from the point. By this arrangement this arm acts as a guard for the point to prevent it from catching in weeds, bushes, &c., and it also prevents a fish from swallowing the hook or from jumping up and cutting the line.

I am aware that heretofore hooks have been made with an attachment to prevent the points from catching in weeds, &c.; but this attachment, as I believe, in every case extended from the shaft directly down into contact with the point of the hook. There are serious and obvious objections to such a hook, especially when it is used on a wary or gamy fish. I am aware also that a patent has been granted on a fish-hook having a rigid arm extending rearwardly from the shaft—that is, on the opposite side of the shaft from the point of the hook. Never yet, however, has there been a hook produced which by the same means protects the hook from fouling or being swallowed and the line from being broken.

I claim as my invention—

A fish-hook having a rigid arm extending from its shaft at an angle thereto, and on the same side of the shaft as the point but at a distance above said point, substantially as described.

EDWIN N. HUBBARD.

Witnesses:
H. E. HART,
L. H. KREIMENDAHL.